J. JOHNSON.
Furniture Casters.

No. 136,522. Patented March 4, 1873.

Witnesses
Chas H Smith
Harold Serrell

Inventor
Job Johnson
Lemuel W. Serrell
atty.

UNITED STATES PATENT OFFICE.

JOB JOHNSON, OF BROOKLYN, NEW YORK.

IMPROVEMENT IN FURNITURE-CASTERS.

Specification forming part of Letters Patent No. 136,522, dated March 4, 1873.

CASE A.

*To all whom it may concern:*

Be it known that I, JOB JOHNSON, of Brooklyn, Kings county, State of New York, have invented Improvements in Ball-Casters, of which the following is a specification:

Before my invention a ball-caster had been made with a metallic ball in a cup, retained by a cap, the bearing for the ball within the cup being hemispherical, and the cap has been screwed on and retained by a bayonet-lock.

My invention is made for connecting the cap more securely to the socket containing the ball. The ball is kept in place by a locking-cap, provided with a lug or lugs entering a groove or grooves in the socket, and a screw or pin inserted in the cap prevents the parts turning or working loose.

Figure 1:
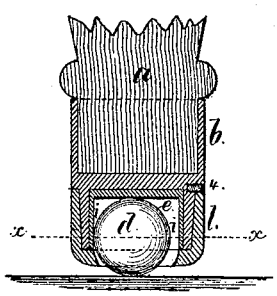
Figure 2:
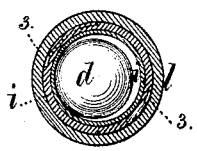
Figure 3:
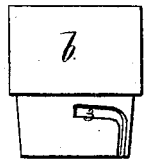

In the drawing, Figure 1 is a vertical section of the caster. Fig. 2 is a sectional plan at the line $x\ x$, and Fig. 3 is an elevation of the socket for the leg and ball.

The leg $a$ of the article of furniture passes into the socket $b$ of the caster, or the parts are connected in any convenient manner. The ball $d$ is received within a cup of very hard steel, with a flat bottom, $e$, and cylindrical sides $i$, the diameter of the cup being slightly greater than that of the ball, and deeper than half the diameter of the ball, so that the said ball will be free within the cup; it will not be obstructed by particles of grit—they can work out freely—and the ball will only touch upon two points as it rolls. A cap, $l$, is employed to retain the ball in place, and this is secured around the metallic socket by a pin upon the inside of the cap passing into a groove, 3, in the outside of said socket, the groove being inclined, as represented in Fig. 3. There may be two of these inclined locking-grooves, and a screw or pin, 4, inserted through the cap $l$, or at the edge thereof, prevents the cap turning or becoming disconnected.

I claim as my invention—

The cap $l$, secured to the socket containing the caster-ball by a pin entering the groove 3, and a screw or pin, 4, to prevent the cap turning, as set forth.

Signed by me this 10th day of December, 1872.

JOB JOHNSON.

Witnesses:
GEO. T. PINCKNEY,
CHAS. H. SMITH.